Figure 1:
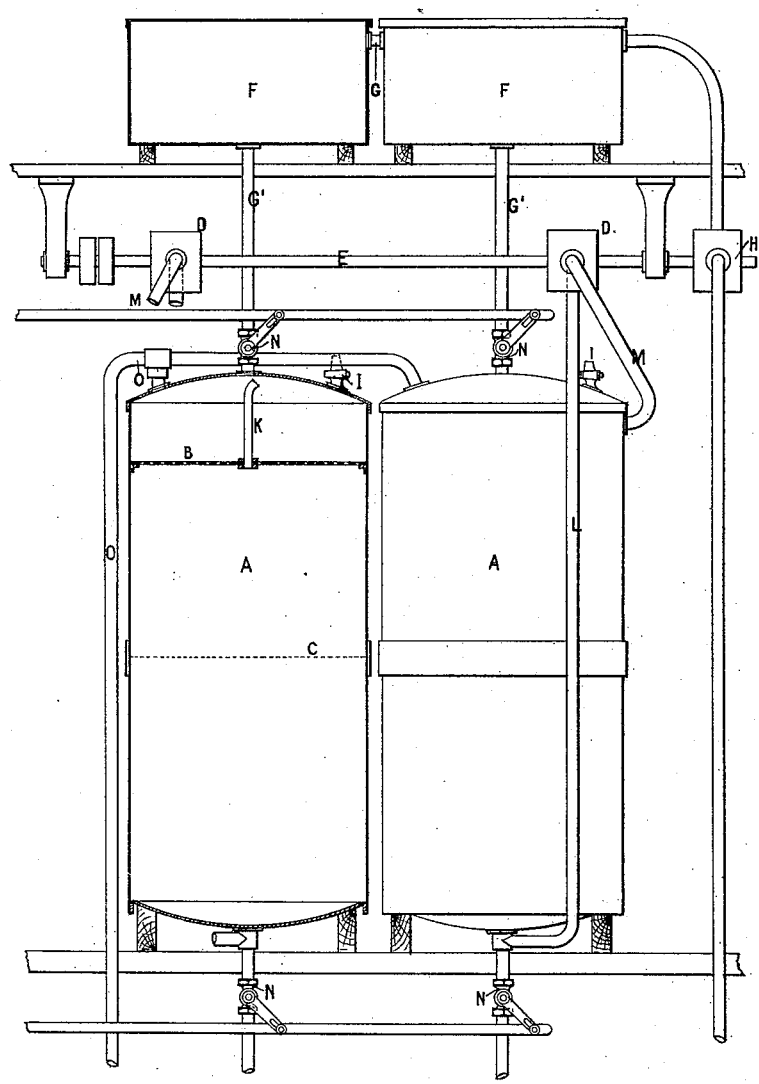

(No Model.) 2 Sheets—Sheet 1.

J. McKINLESS.
APPARATUS FOR MATURING SPIRITS OR OTHER LIQUORS.

No. 471,707. Patented Mar. 29, 1892.

Witnesses:
H. B. Kingsbery

Inventor:
James McKinless
by William E. Poulter
attorney (No Model.) 2 Sheets—Sheet 2.
J. McKINLESS.
APPARATUS FOR MATURING SPIRITS OR OTHER LIQUORS.
No. 471,707. Patented Mar. 29, 1892.
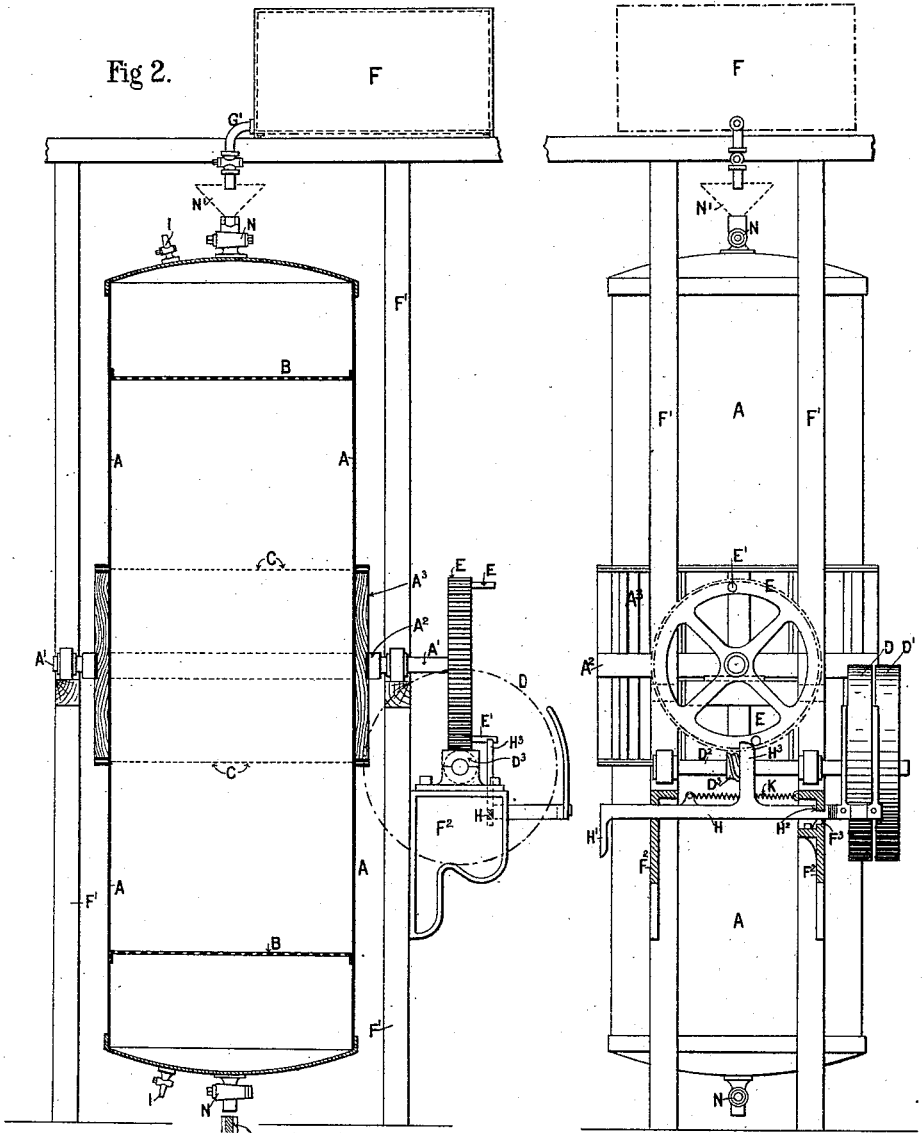
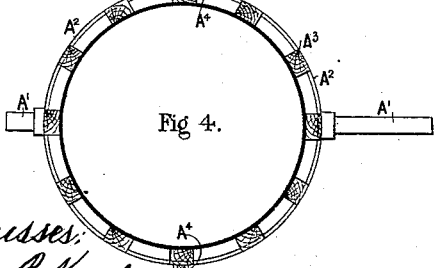

UNITED STATES PATENT OFFICE.

JAMES McKINLESS, OF MANCHESTER, ASSIGNOR TO THE MECHANICAL SPIRIT MATURING SYNDICATE, LIMITED, OF LONDON, ENGLAND.

APPARATUS FOR MATURING SPIRITS OR OTHER LIQUORS.

SPECIFICATION forming part of Letters Patent No. 471,707, dated March 29, 1892.

Application filed July 28, 1890. Serial No. 360,142. (No model.)

*To all whom it may concern:*

Be it known that I, JAMES MCKINLESS, a subject of the Queen of Great Britain, residing at Manchester, in England, have invented new and useful Improvements in Apparatus for Maturing Spirits and other Liquors, of which the following is a specification.

This invention consists in maturing spirits and other liquors by subjecting same to the action of air or oxygen, or a mixture of same, by preference, in a compressed state in a closed vessel containing the spirits or other liquor, which is continuously circulated or moved intermittently therein and in a highly-subdivided state, such circulation or motion causing the intimate action of the air upon the liquor, producing the oxidation of the essential oils therein and their conversion into their ethers or bouquet, so that the liquor is changed into the matured, well-flavored, or aged condition within about a day, and so that when the so-treated liquor is drawn off only a small loss of alcohol is occasioned—viz., the vapors contained in the small escaping quantity of air at the end of the process.

The apparatus which it is preferred to employ for carrying the process into effect consists of a closed chamber or vessel of cylindrical or other cross section with a finely-perforated floor or diaphragm at a convenient distance from the top and with one or more lower floors or diaphragms of metallic gauze. This vessel is charged with the liquor to be treated and compressed or common air is let into it. The taps having been closed, the liquor is by means of a rotary or centrifugal pump or otherwise kept in a continuous circulation while passing down through the perforated diaphragm in the form of a fine shower, and falling on the gauze floor or floors it is broken up into a spray, every particle of which is acted upon by the compressed air. The latter rises through a pipe and collects in the top of the cylinder above the liquor, so as not to interfere with the steady flow of the shower. A slight circulation of the air is thus also effected. At the end of the process the liquor is run into casks and the small quantity of air remaining at the top is allowed to escape, or it may be passed into a condenser for recovering the alcoholic and other vapors contained therein; but the loss of alcohol is found to be so small that it is hardly worth while troubling about it or adding expense to the process and plant.

Another form of apparatus is a cylindrical or other vessel which can turn on central pivots and which is provided at each end with a finely-perforated diaphragm and provided near the middle with two wire-gauze diaphragms. This vessel, after the liquor and the compressed air have been let in, is turned intermittently and after intervals of rest, during which the liquor falls down as spray through the slowly-ascending or displaced compressed air.

Figure 1 of the accompanying drawings shows two vessels constructed according to the first form. The cylindrical vessels A, which may be made of sheet-copper, are two in number as an example, but may be of any required number. B is a floor or diaphragm near the top containing a number of small holes—say about one twenty-fourth inch diameter and one and one-half inches apart. C is another diaphragm made, say, of copper-wire gauze with meshes about thirty to the inch, or twenty-five millimeters. D D are rotary or centrifugal pumps on the shaft E for circulating the liquor, constantly raising it from the bottom by pipes L and sending to the top by pipes M. The compressed air is supplied by the pipe O to the vessel A from a compressed-air reservoir or by any other suitable means. I find that a pressure of one-third of an atmosphere is suitable, but more may be used to expedite the process. The liquor may be supplied direct from barrels or casks, or reservoirs may be used, such as F, and of which any suitable number may be connected at a given level by pipes G, so as to measure a given number of gallons or liters, and the whole may be filled by a rotary pump H or by any other suitable means. I is a small cock for letting out the air of the vessels when they are being charged with liquor. K is a tube rising from the perforated floor B to allow the air to pass back into the top of the apparatus above the liquor, so as not to interfere with the steady flow of the shower. After charging the apparatus with the spirits or other liquor and the taps have been closed compressed air is admitted by the pipes O, and then the pumps are set in motion and maintain a continuous flow of the spirits or liquor for any length of time or until maturity is fully attained. The spirits or liquor pass through the perforated diaphragm B in the form of a fine shower and falling on the gauze diaphragm C are broken up into spray, every particle of which is acted upon by the air, which oxidizes the essential oils and converts them into ethers. It will be understood that by reason of the tube K a circulation of the air takes place within the vessels A, the shower of liquor constantly, on the one hand, meeting and carrying down with it the air in a finely-subdivided state and the air, on the other hand, ascending again through the pipe K and collecting in the top of the vessel, thus always tending to restore the equilibrium. When the process is complete, the liquor is drawn off at the bottom by the taps N and the air allowed to escape by the cocks I, or may, if desired, be conveyed thence to a condenser for regaining the alcohol and ether contained in the air and for putting same into the spirits treated or into spirits to be treated. The air used in the process may, if desired, be washed first by passing it through water or over wet sheets of fabric in any well-known manner.

Fig. 2 is a part sectional side view, Fig. 3 an end view, and Fig. 4 a plan section, of another form of apparatus in which the cylindrical or other vessel A can turn on central pivots A', provided on a hoop $A^2$ in two halves, which are clamped to the vessel A, being let into intermediate pieces of wood $A^3$, so as not to distort the shape of the vessel, which may be of thin sheet-copper, and yet hold it firmly, wood adjustment-pieces $A^4$ or the like being interposed between the joining-flanges of the hoop $A^2$. There is a finely-perforated diaphragm B toward each end of the vessel and one or more—in this example two—finely-meshed wire-gauze diaphragms C near the middle. N N are cocks at each end of the vessel for charging it with the liquor, and I I air-escape cocks. The vessel is rotated by strap and strap-pulley D D', being the fast and loose pulley on a spindle $D^2$, on which is a worm $D^3$, that gears with a worm-wheel E, fixed on one of the pivots A'. The worm-spindle $D^2$ works in bearings on the brackets $F^2$, which are fixed to a wooden or other framing F'. The strap is pulled onto the fast pulley D for slowly rotating the vessel A by means of the handle H' on the striking-bar H, which latter works in slots in the webs of the brackets $F^2$, and has a notch at $H^2$ in its upper side which can catch upon the upper side of the slot in one of the brackets $F^2$, a spring $F^3$ holding it up, thus keeping the strap on the fast pulley. When the vessel A has been charged with the liquor to be treated, a funnel N' being put into the cock N under the outlet-pipe and cock G' from the charging-tank F, and after the compressed air has been admitted—say by the bottom cock I—the striking-bar H is pulled into the position shown and held therein by the notch $H^2$. The vessel A will then be slowly rotated around its axes A' A' until it has been turned half a revolution, or upside down, during which time the liquid is being permeated by the compressed air. On the worm-wheel E are fixed two pins E'. When the lowest pin near the end of the half-revolution comes against the tappet projection $H^3$ on the bar H, the striking-gear end of same will be depressed and its notch $H^2$ be disengaged from the slot in the bracket $F^2$ against the action of the spring $F^3$. The previously-extended helical spring K, which connects the bar H to an eye on the same bracket $F^2$, will then be able to pull the bar H out to the right and shift the strap from the fast pulley D to the loose pulley D' and stop the rotation. To start the rotation, after a slight rest, if desired, the attendant pulls the bar H back by its handle H' (or this may be done automatically by clock-work or other machinery) until it comes to the notch $H^2$, when the spring $F^3$ will raise the bar and cause it to be held by its notch, whereby the strap is brought upon the fast pulley D again and the vessel A makes another half-turn, and so on. The liquor at the bottom is thus each time returned to the top.

What I claim as my invention, and desire to secure by Letters Patent, is—

1. A closed vessel having an upper finely-perforated diaphragm upon which the liquor falls and whence it descends in the form of a shower, and a finely-meshed wire-gauze diaphragm for receiving such shower and for breaking it up into spray, in combination with means for raising the liquor again and again to the top of the vessel and causing it to be repeatedly exposed to the air contained in the vessel until the essential oils in the liquor have become oxidized or converted into ether or bouquet, means being also provided for allowing the air to find its way rapidly to the top again or to tend to establish equilibrium, substantially as set forth.

2. A closed vessel A, having a finely-perforated diaphragm B, with vent-pipe K for furthering the reascent of the air in the vessel, a finely-meshed wire-gauze diaphragm C, and pipes L and M, and a pump D, interposed between said pipes for circulating the liquor to be matured, substantially as set forth.

JAMES McKINLESS.

Witnesses:
 JOSEPH HOWARTH,
 J. WESLEY C. STAFFORD,
*Clerks with Ormerod & Allen, Solicitors and Notaries, Manchester.*